UNITED STATES PATENT OFFICE.

PAUL VOLLMANN, OF ALTENBURG, GERMANY.

PROCESS OF PREPARING MALT.

SPECIFICATION forming part of Letters Patent No. 665,489, dated January 8, 1901.

Application filed July 12, 1900. Serial No. 23,397. (No specimens.)

*To all whom it may concern:*

Be it known that I, PAUL VOLLMANN, a subject of the King of Saxony, and a resident of Altenburg, in the Kingdom of Saxony, Germany, have invented a Process of Preparing Malt, of which the following is a full, clear, and exact description.

The present invention relates to a process of producing malt for making beer which shall be ready for consumption a short time after it has been brewed.

By means of the present invention and the particular treatment of the barley comprised therein, after the same has been steeped and spread and repeatedly turned, a malt is obtained from which a beer may be brewed which is ready for consumption within a fortnight and possesses all the characteristics of well-stored beer. After the barley has been steeped for two or three or four days and then, according to the degree of softness, spread out in more or less thick layers to dry and from time to time turned as germination proceeds in order to keep the temperature down to from 20° to 22° centigrade, these operations occupying until about the sixth day, it is thrown up into heaps about two meters in height, more or less, and allowed to stand for a day. It is then spread out to allow it to cool and remains in this condition for the space of about six hours. As soon as it has cooled down the malt is again thrown up into heaps, as previously described, and allowed to lie thus for another day, whereafter it is taken to the kiln and further treated in the well-known manner.

By heaping up the malt the same is considerably loosened and the production of sugar promoted. The effect of the process is to produce a malt which develops aromatic properties on being subjected to the action of the kiln and which on fermentation produces a beer having the properties of a well-stored and mature beer.

The invention thus renders possible the production of a larger quantity of beer without the necessity of increasing the size of the storage-cellars of the brewery.

I claim as my invention—

In the process of producing malt, steeping the grain for from three to four days, spreading out the steeped grain on the drying-floor and repeatedly turning the said grain, for the space of about six days, then heaping it up in heaps of about two meters high and allowing it to stand thus for a day, then again spreading it out and allowing it to lie for the space of about six hours, then again heaping it up and allowing it to stand for a day, and finally treating it on the kiln in the usual manner.

In witness whereof I have hereunto set my hand in presence of two witnesses.

PAUL VOLLMANN.

Witnesses:
 HERM. SACK,
 RUDOLPH FRICKE.